United States Patent

[11] 3,563,349

| [72] | Inventors | Rudolf Spieth<br>Plochingerstrasse 156, Esslingen;<br>Erich Blazek, Lindenstrasse 3, Altbach,<br>Germany |
|---|---|---|
| [21] | Appl. No. | 777,667 |
| [22] | Filed | Nov. 21, 1968 |
| [45] | Patented | Feb. 16, 1971 |
| [32] | Priority | Jan. 24, 1968 |
| [33] | | Germany |
| [31] | | P 16 75 367.6 |

[54] BLOCKABLE DEVICE FOR THE STEPLESS ADJUSTMENT OF FLAPS
9 Claims, 2 Drawing Figs.

[52] U.S. Cl. ............................................. 188/300;
       137/614.11
[51] Int. Cl. .............................................. B65h 59/10
[50] Field of Search ..................................297/(Inquired),
       355; 248/(Inquired), 161;
       188/(Inquired), 96.9, 96.51, 88.505, 88.509;
       92/255, 256; 91/422, 222; 137/(Inquired), 614.11,
       614.19; 188/96.9, 96.51

[56] References Cited
UNITED STATES PATENTS

| 662,598 | 11/1900 | Knowlson | 137/614.11X |
|---|---|---|---|
| 1,894,741 | 1/1933 | Hartog | 137/614.11X |
| 2,675,829 | 4/1954 | Livers | 137/614.11X |
| 3,236,515 | 2/1966 | Ackerman | 297/355X |
| 3,415,159 | 12/1968 | Hornlein et al. | 91/422X |
| 3,447,645 | 6/1969 | Dorner et al. | 188/96.9 |
| 3,457,842 | 7/1969 | Tennis | 92/256 |

FOREIGN PATENTS

| 802,987 | 2/1951 | Germany | 137/614.11 |
|---|---|---|---|
| 974,312 | 11/1964 | Great Britain | 188/96.51 |
| 420,080 | 4/1947 | Italy | 137/614.19 |

*Primary Examiner*—Martin P. Schwadron
*Assistant Examiner*—Irwin C. Cohen
*Attorney*—Stevens, Davis, Miller & Mosher

ABSTRACT: An improved piston-cylinder arrangement, more particularly for the stepless adjustment of table tops, chairs and the like, comprising a piston rod with a piston slidingly mounted in a cylinder containing a pressurized gas, wherein the piston is sealed against the inner cylinder wall by means of an annular seal which is bridged by a continuous flow channel inside the piston, the outlets of which are each closed on both sides of the said annular seal by separate annular-spring biased valves which can be opened by externally actuable means.

Patented Feb. 16, 1971
3,563,349
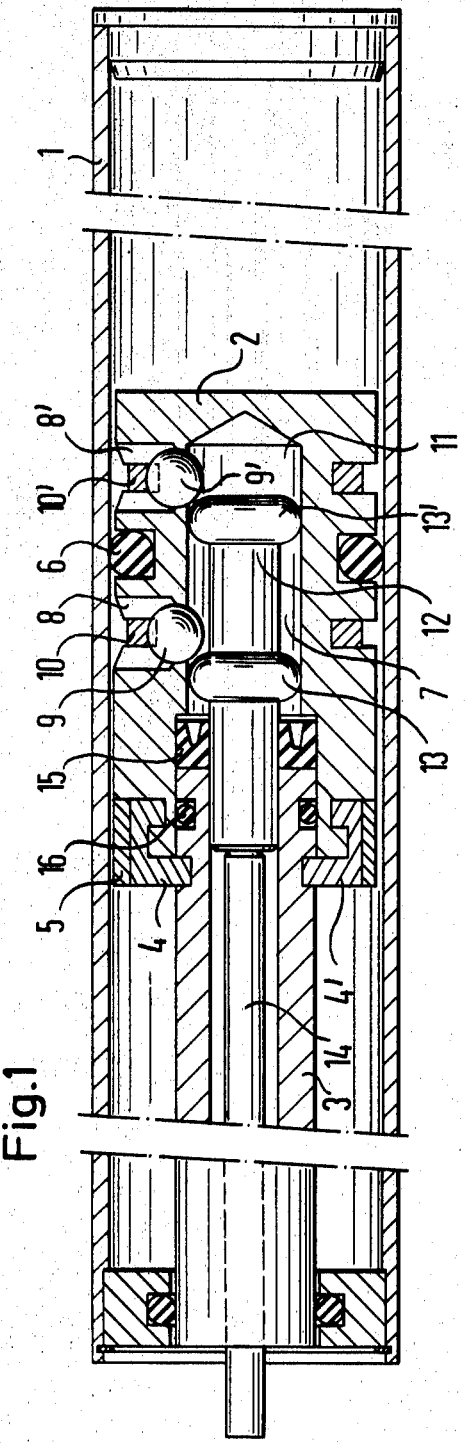

BLOCKABLE DEVICE FOR THE STEPLESS ADJUSTMENT OF FLAPS

DESCRIPTION

The invention relates to a blockable device for adjusting flaps or other movable parts, comprising a cylinder filled with a pressure medium, a piston with a piston rod protruding from the cylinder and slidingly arranged therein, which piston is sealed against the cylinder and provided with a continuous connecting channel, the flow cross section of which can be completely closed in such a manner that the passage of the pressure medium from the front of the piston to its rear is prevented.

There are already known a number of blockable devices for the stepless adjustment of plates, flaps or other moving parts, particularly for the vertical adjustment of chairs and tables. These devices, constructed as pneumatic or hydropneumatic lifting units, consist generally of a cylinder filled with one or more pressure media, with a piston and piston rod slidingly mounted therein. The piston is sealed against the inner wall of the cylinder and is equipped with one or several flow channels which permit the flow therethrough of the pressure medium from one side of the piston to the other with a corresponding movement of the piston rod. The flow cross section of these passages, representing a communicating conduit between both faces of the piston, can be blocked by obturating means which are actuable from the outside. This external actuation may be actuable from the outside. This external actuation may be accomplished by rotating or axially moving a control rod mounted inside the hollow piston rod, such as is known from the construction of shock absorbers.

These known devices have a number of disadvantages. Thus, for example, the useful life of the blocking or obturating means and of the sealing means, necessary for closing the flow cross section of the communicating conduit and thus for the blocking, is rather limited, partly due to the fact that under the influence of the alternation of tensile and compressive forces acting on the arrangement, the direction of stress in the blocking and sealing means changes continuously. This alternation in the force flux occurs particularly, where these blockable devices are used for the stepless adjustment of seats in automobiles, because the vibrations and oscillations occurring during the operation of the vehicle give rise to loads which alternate continuously between tension and compression.

A further disadvantage is that in many lifting units the blocking means are pushed away from the sealing surface either by tensile or by compressive forces, resulting again a considerable wear and loss of sealing properties. There is also the further drawback that a complete blocking cannot be achieved, because, when a certain maximum force is exceeded, the blocking means are torn from the flow orifice. This is particularly inconvenient when the adjusting mechanism is incorporated into a device for adjusting the slope of a seat in an automobile: during sudden braking, there is a risk that an occupant on the rear seat might be thrown forward, pushing the squab of the passenger seated in front towards the front, if the impact exceeds the maximum blocking force.

A further substantial disadvantage of the known devices is that the inner valve chamber formed in the piston by the continuous communicating channel is subjected to continuously alternating forces resulting from the tensile and compressive loads applied to the device, and a strong pressure rise results particularly under tension. In view of these stresses, the seal mounted in the valve chamber, sealing, for example, an axially outwardly projecting piston rod, or the valve body itself, is subject to substantial wear.

It is an object of the invention to eliminate these drawbacks encountered in known devices.

According to the invention, this object is realized in that, in a device of the kind hereinbefore described, each of the two outlet orifices of the communicating channel is adapted to be closed by a separate valve body upstream and downstream of the said piston seal.

In a preferred embodiment of the invention, the said valve bodies are balls which are each pushed by an elastic spring element against an appropriate sealing face of the associated outlet orifice and close the same thereby.

In a further preferred embodiment of the invention, there is provided an adjusting member equipped with two cams or beads, axial displacement of which displaces the balls against the force of the springs from the closing position into the open position. The said adjusting body may be mounted in a center bore of the piston.

In yet another preferred embodiment of the invention, the piston rod has an inner bore with a control rod mounted therein, which is axially displaceable and connected with the said adjusting body.

The said piston rod may be connected with the piston in an axially undisplaceable manner, but rotatably, and with the adjusting body in a nonrotatable manner, wherein the latter is provided with two cams facing the valve bodies.

Further details, features and advantages of the invention will become apparent from the following description with reference to the accompanying drawing, showing preferred embodiments thereof, and from the appended claims. In the drawings:

FIG. 1 is a cross section of a first preferred embodiment of the device according to the invention; and FIG. 2 is a cross section of a second preferred embodiment of the device according to the invention.

In a cylinder 1, filled with a pressure medium, a piston 2 is axially slidingly mounted; a piston rod 3 is connected to the piston and projects from one end of the cylinder. The connection between the piston rod 3 and the piston 2 is achieved by means of two cylindrical half-shells 4, 4', equipped with a shouldered lug and an annular groove and engaging into a corresponding lug and a corresponding groove in the piston 2 and in the piston rod 3, respectively. In this manner, the piston rod 3 and the piston 2 are interconnected in an axially undisplaceable manner. The falling apart of the two semicylindrical shells 4 and 4' is prevented by an undivided ring 5 which is pushed over the two shells 4 and 4'.

The piston 2 is sealed against the inner wall of the cylinder 1 by a known seal, preferably by an O-ring 6. The piston 2 has a connecting channel 7 which connects the front face of the piston with its rear face, thereby bridging the O-ring 6. Thus, the connecting channel has two outlet orifices 8 and 8', one of which is positioned upstream or in front of the O-ring 6 and the other downstream or behind the same. Each outlet orifice 8 and 8' is closed by a separate valve body. These valve bodies are preferably balls 9 and 9', and are each pressed by an annular spring 10 and 10' against a seat located in the piston, into the closed position. An adjusting body 12 is mounted in a center bore 11 of the piston 2 and has two annular beads 13 and 13'. When the adjusting body 12 is axially displaced, the two beads 13 and 13' make contact with the two balls 9 and 9', causing them to be lifted off their respective seats against the force of the associated annular springs 10 and 10'.

FIG. 1 shows the two balls 9 and 9' in the closed position. If the adjusting body is now pushed from the left to the right to the end of the inner bore 11, which forms a limit stop, the two balls 9 and 9' are lifted off their respective seats and permit the free flow of the pressure medium from one side of the piston to the other. This relieves the blocking effect, present when the balls 9 and 9' are in the closed position, and permits a relative movement between the piston rod 3 and the cylinder 1 which are each connected to one of the parts or plates which are to be relatively moved.

The axial displacement of the adjusting body 12 is effected by means of a control rod 14 located inside an inner bore of the piston rod 3, and adapted to be operated from the outside. A seal, constructed after the manner of a sleeve 15, and a further seal in the form of an O-ring 16, prevent with reliability loss of the pressure medium from the cylinder 1 through the hollow piston rod.

The embodiment shown in FIG. 2 differs from the FIG. 1 embodiment primarily in that the balls 9 and 9' are not operated by an axial displacement of the adjusting body 12, but by a rotation thereof. The adjusting body 12 is mounted in an axially fixed manner and is rotated from the outside, whereby the balls 9 and 9' are lifted off by oppositely mounted cams 13a and 13a'. The rotation of the adjusting body 12 is achieved either by rotating the piston rod 3, connected in this case with the piston 2 in a rotatable, but axially undisplaceable manner, or by a control rod, which is mounted within the piston rod, which is, in this case, a hollow member.

Apart from this peculiarity, the embodiment of FIG. 2 does not differ from that shown in FIG. 1, and corresponding parts are therefore marked with additional indices, whilst the same parts are designated by the same reference numerals.

Generally, the pressure medium for charging the cylinder is a compressible medium, preferably compressed air. However, in some cases it might be preferable to charge that part of the cylinder, in which the pistons is slidably mounted, with a noncompressible fluid, preferably with oil, whilst another part of the cylinder is filled with compressed air, which is always required for equalizing the displacement volume of the piston rod during its inward and outward travel. Preferably, the fluid and the compressed air are separated by a sliding piston. The advantage of the construction, in which the piston moves in oil, is particularly in the throttling effect produced during the inward and outward movements of the piston rod, that is to say, the adjusting movements are damped and the seals are subject to less wear, owing to the fluid lubrication effect.

The adjusting device according to the invention has the following substantial advantages.

In view of the obturation of both outlet orifices of the connecting channel, connecting the front side of the piston with its rear side, by means of separate sealing members, wear of the seals is reduced to a minimum. In this connection it is also an advantage that the valve bodies are urged against their respective seats both by tensile and by compressive forces, that is to say, they are not subjected to alternating forces and pressures, because just these undesirable vibrations and oscillations give rise to strongly accelerated wear.

The inner bore of the piston, in which the adjusting body is mounted, is completely separated from the pressure medium in the remaining part of the cylinder, when the outlet orifices of the connecting channel are blocked. The release and actuating force for moving the adjusting body may therefore be determined, under the assumption that the additional volume of the piston rod entering the cylinder is small, compared with the overall volume of the cylinder, simply by the bias of the compressed gas, and is not subject to any other changes, such as in various known devices, in which the release force is reduced when a tensile force is applied, that is to say, in these arrangements a high biasing force must be provided in order to prevent accidental release, and this large biasing force is obviously undesirable for normal and usual release operation.

A great advantage of the device according to the invention is the fact that the seal 15, located in the inner chamber of the piston and sealing the passage of the axially mounted control rod, is not subject to alternating pressures arising from tensile and compressive stresses, and that no pressure increase takes place under tension, because the inner chamber of the piston is completely isolated from the two chambers of the cylinder 1, filled with the pressure medium, by the two balls, when these are in the closing position.

Yet another advantage is that the construction according to the invention provides a simple means for producing a reliable blocking effect with a very low and soft release force.

In the embodiment, in which the piston is mounted in a pressure fluid, complete blocking under tension may be achieved, because with a rising pressure of the pressure fluid, the two valve bodies are pressed even more strongly against their respective seats.

The piston rod is connected with the piston in a very simple and reliable manner by means of the said two semicylindrical shells, thus eliminating the disadvantages of hitherto known constructions, and more particularly threaded connections.

A preferred field of application of the device according to the invention is the stepless adjustment of table tops and chairs, as well as of rear squabs and seats, particularly in automobiles and airplanes. Generally, the device according to the invention can be used for any stepless adjustment and for the blocking of flaps and other movable parts.

We claim:

1. A piston-cylinder device for the stepless adjustment of relatively movable parts and for blocking same in any desired position, comprising a cylinder containing pressurized fluid; a piston rod, mounted axially displaceably within said cylinder, projecting at one end in a sealed manner from said cylinder and connected at its other end with a piston sealed by an annular seal against the inner bore of said cylinder, wherein said piston comprises at least one continuous connecting conduit bridging said annular seal; and having a plurality of outlet orifices obturating means comprising a plurality of valve means each associated with elastic spring elements which press each associated valve means from the outside against a seat on an associated outlet orifice, wherein said elastic spring elements are each formed by an annular spring mounted on the outer periphery of said piston; whereby said outlet orifices of said connecting conduit are completely closed on both sides of said annular seal; and means concurrently opening said obturating means and the flow cross section of said outlet orifices.

2. A piston-cylinder device as set forth in claim 1, wherein said means for opening comprises an adjusting body with two beads mounted axially displaceably within the connecting conduit in the piston, whereby, when the adjusting body is moved, the valve means are pushed outwardly against the force of their associated springs from the closed position into the open position.

3. A piston-cylinder device as set forth in claim 2, wherein the piston rod has a central, axial, bore, in which a control rod is axially displaceably mounted, wherein this control rod is connected with the said adjusting body and is adapted to be actuated from the outside.

4. A piston-cylinder device as set forth in claim 1, wherein said means for opening comprises an adjusting body, mounted rotatably in the said connecting conduit, and equipped with two cams which lift, during the rotation of the adjusting body, the valve means off their respective seats and open the flow cross section of both outlet orifices of the said connecting conduit.

5. A piston-cylinder device as set forth in claim 4, wherein the piston rod is connected with the piston in an axially undisplaceable, but rotatable manner and with the adjusting body in a nonrotatable manner.

6. A piston-cylinder device as set forth in claim 4, wherein the piston rod has a central, axial bore, in which a control rod is mounted axially nondisplaceably, but externally rotatably, and wherein this control rod is connected in a nonrotatable manner with the adjusting body.

7. A piston-cylinder device as set forth in claim 3, including two semicylindrical rings, each provided with an annular recess which cooperates with an annular projection of the piston, and comprising further an outer ring member by means of which the two inner semicylindrical rings are held together.

8. A piston-cylinder device comprising: a cylinder containing fluid under pressure; a piston rod arranged in axially displaceable manner in said cylinder, one end of said piston rod extending outwardly in sealed fashion from said cylinder, the other end of said piston rod being connected with a piston which is sealed with respect to the inner wall of said cylinder by an annular packing, said piston comprising at least one continuous connecting channel which bridges said annular packing and has a plurality of outlet openings provided with a sealing surface, said openings lying on both sides of said annular packing, a plurality of shutoff members, each of which is associated with one of said plurality of sealing surfaces of said outlet openings, a plurality of annular springs respectively associated with said shutoff members by which said shutoff members are pressed from the outside against the associated sealing surfaces of said outlet openings into a closed position in which the passage cross sections of said plurality of outlet openings are completely closed, and means for concurrently lifting said shutoff members from their sealing surfaces and for opening said passage cross sections of said outlet openings.

8. A piston-cylinder device according to claim 8, in which said shutoff members each comprises a valve ball.